(12) United States Patent
Oberheu (10) Patent No.: US 8,943,442 B1
(45) Date of Patent: Jan. 27, 2015

(54) CONTROLLING OPERATIONS FOR EXECUTION

(75) Inventor: Kent Oberheu, Berkeley, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 1064 days.

(21) Appl. No.: 12/953,136

(22) Filed: Nov. 23, 2010

Related U.S. Application Data (63) Continuation-in-part of application No. 12/756,046, filed on Apr. 7, 2010.

(60) Provisional application No. 61/284,475, filed on Dec. 21, 2009.

(51) Int. Cl.
*G06F 3/048* (2013.01)

(52) U.S. Cl.
USPC ........... 715/854; 715/810; 715/825; 715/841; 715/853; 715/855

(58) Field of Classification Search
None
See application file for complete search history.

(56) References Cited

U.S. PATENT DOCUMENTS

| | | | |
|---|---|---|---|
| 6,282,699 B1 | 8/2001 | Zhang et al. | |
| 6,298,474 B1 | 10/2001 | Blowers et al. | |
| 6,606,105 B1 * | 8/2003 | Quartetti | 715/853 |
| 6,763,515 B1 | 7/2004 | Vazquez et al. | |
| 7,020,868 B2 | 3/2006 | Debbins et al. | |
| 7,290,216 B1 | 10/2007 | Kawahara et al. | |
| 7,463,263 B2 | 12/2008 | Gilboa | |
| 7,640,517 B2 * | 12/2009 | Moehrle | 715/855 |
| 8,010,910 B2 * | 8/2011 | Wright et al. | 715/854 |
| 8,280,179 B2 * | 10/2012 | Lin | 382/240 |
| 8,516,385 B1 * | 8/2013 | Eismann et al. | 715/763 |
| 8,549,407 B2 * | 10/2013 | O'Neil Garcia | 715/738 |
| 8,769,421 B2 * | 7/2014 | Meaney et al. | 715/756 |
| 2002/0032697 A1 | 3/2002 | French et al. | |
| 2003/0172078 A1 * | 9/2003 | Stumpf | 707/100 |
| 2003/0197738 A1 * | 10/2003 | Beit-Zuri et al. | 345/786 |
| 2003/0218634 A1 | 11/2003 | Kuchinsky et al. | |
| 2004/0169688 A1 * | 9/2004 | Burdick et al. | 345/854 |
| 2005/0234979 A1 * | 10/2005 | Martineau et al. | 707/103 X |
| 2005/0278351 A1 * | 12/2005 | Niyogi et al. | 707/100 |
| 2006/0123361 A1 * | 6/2006 | Sorin et al. | 715/854 |

(Continued)

OTHER PUBLICATIONS

Audiovisual Panorama "The Foundry Nuke Starts Selling 5.2", Aug. 27, 2009, downloaded from the internet at: http://www.panoramaaudiovisual.com/en/2009/08/27/starts-selling-the-foundry-nuke-5-February/ on Jul. 1, 2011, 2 pages.

(Continued)

*Primary Examiner* — Matt Kim
*Assistant Examiner* — Yongjia Pan
(74) *Attorney, Agent, or Firm* — Kilpatrick Townsend & Stockton LLP (57) ABSTRACT

A computer-implemented method of controlling operations for execution includes displaying, in a display device area that controls a process of operations, a current container providing at least a first operation to the process, and a linear sequence representing parent containers of the current container organized in a hierarchy. The method includes receiving, in a system generating the display device area, a partial-performance request identifying a subset of the parent containers defined between the current container and a level in the hierarchy. The method includes performing, in response to the partial-performance request, the first operation and those of the operations that the subset of the parent containers provide to the process.

18 Claims, 10 Drawing Sheets

(56) References Cited

U.S. PATENT DOCUMENTS

| | | | |
|---|---|---|---|
| 2007/0162953 A1 | 7/2007 | Bolliger et al. | |
| 2009/0063547 A1* | 3/2009 | Wright et al. | 707/102 |
| 2010/0070856 A1* | 3/2010 | Behl et al. | 715/704 |
| 2011/0276562 A1* | 11/2011 | Madden-Woods et al. | 707/722 |

OTHER PUBLICATIONS

Bragdon, "Code Bubbles: Rethinking the User Interface Paradigm of Integrated Development Environments", downloaded from the internet at: http://www.youtube.com/comment_servlet?all_comments&v=PsPX0nEIJ0k on Apr. 7, 2010, 8 pages.

Bragdon, "Code Bubbles: Rethinking the User Interface Paradigm of Integrated Development Environments", downloaded from the internet at: http://www.youtube.com/watch?v=PsPX0nEIJ0k on Apr. 7, 2010, 2 pages.

Bragdon, "Code Bubbles: Rethinking the User Interface Paradigm of Integrated Development Environment, Bubbles Metaphor", downloaded from the internet at: http://www.cs.brown.edu/people/acb/codebubbles_details.htm on Apr. 7, 2010 2 pages.

Bragdon, "Code Bubbles: Rethinking the User Interface Paradigm of Integrated Development Environment, FAQ", downloaded from the internet at: http://www.cs.brown.edu/people/acb/codebubbles_faq.htm on Apr. 7, 2010 2 pages.

Bragdon, "Code Bubbles: Rethinking the User Interface Paradigm of Integrated Development Environment, Overview", downloaded from the internet at: http://www.cs.brown.edu/people/acb/codebubbles_site.htm on Apr. 7, 2010 2 pages.

Johnson, "DJX Blog: Layering Shaders with MentalRay", Feb. 1, 2008, downloaded from the internet at : http://www.djx.com.au/blog/2008/02/01/layering-shaders-with-mentalray/ on Jul. 1, 2011, 9 pages.

Los Angeles Final Cut Pro User Group (undated screenshot from product that was commercially available more than one year before the priority date of this patent application), downloaded from the internet at: http://www.lafcpug.org/images_basic_chroma_sample/ShakeScript2.jpg on Jun. 30, 2011, 1 page.

Open Movie Editor (undated screenshot from product that was commercially available more than one year before the priority date of this patent application), downloaded from the internet at: http://www.openmovieeditor.org/images/node_filters_shadow.gag, on Jun. 30, 2011, 1 page.

Schultz, "Navigating with the Address Bar in Windows Vista's Windows Explorer", downloaded from the internet at: http://articles.techrepublic.com.com/5100-10878_11-6116684.html on May 26, 2010, 6 pages.

The Foundry Visionmongers Ltd. "The Foundry at NAB 2011", Apr. 12, 2011, downloaded from the internet at: http://www.thefoundry.co.uk/articles/2011/04/12/240/the-foundrv-at-nab-2011/#NUKE on Jul. 1, 2011, 5 pages.

.theprodukkt ".theprodukkt will make you happy" downloaded from the internet at: http://www.theprodukkt.com/theprodukkt on Oct. 14, 2009, 3 pages.

Wikipedia, "URL bar", downloaded from the internet at: http://web.archive.org/web/20080122161603/http:/en.wikipedia.org/wiki/Address_bar on Jun. 22, 2011, last modified on Dec. 24, 2007, 2 pages.

Konstantinos et al., The Khoros Software Development Environment for Image and Signal Processing, May 1994, IEEE Transactions on Image Processing, vol. 3, No. 3, pp. 243-252.

* cited by examiner

CONTROLLING OPERATIONS FOR EXECUTION

CROSS-REFERENCE TO RELATED APPLICATIONS

This application is a continuation-in-part of, and claims the benefit of U.S. patent application Ser. No. 12/756,046, filed Apr. 7, 2010, which claims the benefit of U.S. Provisional Application Ser. No. 61/284,475, filed Dec. 21, 2009, the entire contents of both of which are incorporated herein by reference.

TECHNICAL FIELD

This document relates to controlling operations for execution.

BACKGROUND

User interfaces may provide a framework to a user for controlling operations for execution of a process. Some frameworks provide a visual representation of the operations. If users must spend a great deal of time navigating the framework to locate a particular operation or sub-operation of the process, this results in lost productivity. In addition, theses user interfaces may not provide a mechanism to select a sub-set of the operations for performance, or visually represent the replication or cloning of an operation or sub-operation within the process.

SUMMARY

This document describes systems and techniques by which a user selects or otherwise controls one or more operations that are to be executed, the user doing this by interacting with content displayed on a screen. As described below, the content can include hierarchically arranged containers representing performable operations. When any container in the hierarchy is displayed, the "path" of parent containers leading to the container can be indicated by a linear sequence adjacent the container. When there is more than one path to the current container in the hierarchy, two (or more) linear sequences can be shown, to illustrate this fact to the user. The user can also drag the cursor from the displayed container and upward in the path, to select an arbitrary group of containers in the path whose operations to perform, rather than having the operations of all containers be performed.

In a first aspect, a computer-implemented method of controlling operations for execution includes displaying, in a display device area that controls a process of operations defined by containers organized in a hierarchy, a current container providing at least a first operation to the process; receiving, in a system generating the display device area, a path reveal request for the current container; and displaying, adjacent the current container in the display device area and in response to the path reveal request: a first linear sequence that represents first parent containers of the current container corresponding to a first path in the hierarchy; and a second linear sequence that represents second parent containers of the current container corresponding to a second path in the hierarchy.

Implementations can include any or all of the following features. The method includes receiving, in the system, user input corresponding to a hovering operation by a cursor proximate to one of the parent containers in the first linear sequence or the second linear sequence; and displaying, in the display device area, each sibling item associated with the parent container. The first path and the second path are displayed parallel to each other. The first path is displayed nearer the current container than the second path, based on the first path having been used for navigating to the current container. The process of operations is directed to the generation of at least one composite image corresponding to the operations of the first linear sequence or the second linear sequence. The method includes receiving, in the system, user input corresponding to an isolation request for one of the parent containers in one of the first linear sequence and the second linear sequence; and displaying, in the display device area, the parent container in isolation from a remainder of either the first linear sequence or the second linear sequence. The method includes receiving, in a system generating the display device area, a partial-performance request for one of the first and second linear sequences, the partial-performance request identifying a subset of the first or second parent containers defined between the current container and a level in the hierarchy; and performing, in response to the partial-performance request, the first operation and those of the operations that the subset of the parent containers provide to the process. The partial-performance request is received from at least one user input device and is generated by a dragging operation starting at the current container and ending at the level in the hierarchy.

In a second aspect, a computer program product is tangibly embodied in a computer-readable storage medium and includes instructions that when executed by a processor perform a method for controlling operations for execution, the method comprising: displaying, in a display device area that controls a process of operations defined by containers organized in a hierarchy, a current container providing at least a first operation to the process; receiving, in a system generating the display device area, a path reveal request for the current container; and displaying, adjacent the current container in the display device area and in response to the path reveal request: a first linear sequence that represents first parent containers of the current container corresponding to a first path in the hierarchy; and a second linear sequence that represents second parent containers of the current container corresponding to a second path in the hierarchy.

Implementations can include any or all of the following features. The method further includes: receiving, in a system generating the display device area, a partial-performance request for one of the first and second linear sequences, the partial-performance request identifying a subset of the first or second parent containers defined between the current container and a level in the hierarchy; and performing, in response to the partial-performance request, the first operation and those of the operations that the subset of the parent containers provide to the process. The partial-performance request is received from at least one user input device and is generated by a dragging operation starting at the current container and ending at the level in the hierarchy.

In a third aspect, a computer program product is tangibly embodied in a computer-readable storage medium, the computer program product including instructions that, when executed, generate in a display device area a graphical user interface for controlling operations for execution, the graphical user interface comprising: a current container providing at least a first operation to a process; a first linear sequence that represents first parent containers of the current container organized in a hierarchy and corresponding to a first path in the hierarchy; a second linear sequence that represents second parent containers of the current container organized in the hierarchy and corresponding to a second path in the hierarchy; and a first input control for generating a path reveal request for the current container; wherein the first linear sequence and second linear sequence are displayed, in the display device area, adjacent to the current container and in response to the path reveal request.

Implementations can include any or all of the following features. The graphical user interface further comprises: a second input control responsive to a hovering operation by a cursor proximate to one of the parent containers in the first linear sequence or the second linear sequence; and a first presentation control for displaying, in the display device area, each sibling item associated with a parent container. The graphical user interface further comprises: a third input control responsive to user input corresponding to an isolation request for one of the parent containers; and a second presentation control for displaying, in the display device area, the parent container in isolation from a remainder of the first linear sequence or the second linear sequence. The first path and the second path are displayed parallel to each other. The first path is displayed nearer the current container than the second path, based on the first path having been used for navigating to the current container. The process of operations is directed to the generation of at least one composite image corresponding to the operations of the first linear sequence or the second linear sequence. The graphical user interface further comprises: a second input control for generating a partial-performance request for one of the first and second linear sequences, the partial-performance request identifying a subset of the first or second parent containers defined between the current container and a level in the hierarchy. The second input control is responsive to input from at least one user input device generated by a dragging operation starting at the current container and ending at the level in the hierarchy.

Implementations can provide any or all of the following advantages. The user can conveniently select only the desired portions of the process they wish to perform. The graphical user interface can intuitively represent a complex hierarchy of items. The graphical user interface can intuitively represent multiple paths to a root container in the container hierarchy.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
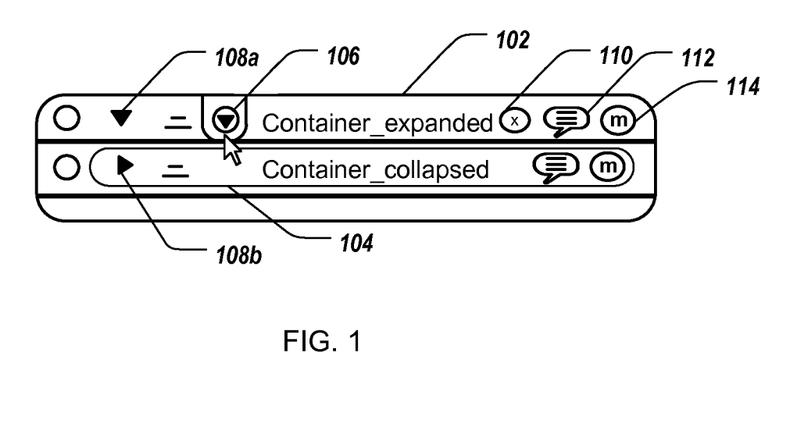
FIG. 1 shows an example representation of a container presented in a graphical user interface that can control operations for execution of a process.

FIG. 1 shows an example representation of a container 102 presented in a graphical user interface. In general, the graphical user interface may be displayed on a display device. Furthermore, the presented containers may control operations for execution of a process. The containers control operations for the process at least in the sense that including a specific container in the process adds one or more functions associated with that container to the process. In other words, each container provides one or more operations to the process. In some implementations, the process may be an image compositing process and each of the operations may be directed to compositing a portion of the image. In other implementations, another process can be controlled, such as a computer-controlled manufacturing operation. Below will be described examples of visualizing alternative paths that lead to a container, so that each visualized path is interactive and can be used for multiple purposes independently of which path was actually used for navigating to the container.

Each of the operations is represented by a container in the graphical user interface. In general, each of the containers may include any number of items. In some implementations, each item corresponds to either a container or a function. In general, the functions may be configured to perform one or more portions of a particular operation of the process. That is, in some implementations, containers and functions are defined as follows:

Containers have contents (i.e., one or more other items), and functions do not.

Containers can be opened (e.g., to visualize the other item(s)), and functions cannot.

However, other elements that are used to control operations for execution of a process may also be presented. For example, in some implementations, an item may be or otherwise include a mask which is performed prior to the one or more operations represented by the item. Masks are described in more detail below.

In general, a container may be a parent container or a sibling container. For example, in some implementations, a parent container includes one or more sibling items, such as a sibling container and/or one or more sibling functions. Furthermore, the parent container and sibling container designations are not mutually exclusive. That is, for example, a container included in one parent container may also be a parent container to a different collection of sibling items.

The graphical user interface may be used to present a container according to a user selection. For example, here, the presentation of the "Container_expanded" container 102 may be in response to an isolation request according to received user input from a pointing device (e.g., a mouse, stylus, or other device), a keyboard, other user input devices, or combinations of these.

In some implementations, the default state of a selected container is that the container is open with its first level of contents revealed. For example, the "Container_expanded" container 102 is opened (e.g., the opened state is indicated by the down-facing orientation of graphical user interface component 108a) showing that the container 102 includes the unopened "Container_collapsed" container 104 (e.g., the unopened state is indicated by the right-facing orientation of the graphical user interface component 108b). In some implementations, if a container has no contents, it is closed by default.

The container 102 may include a number of input controls that provide certain functionality to a user. For example, here container 102 includes input controls 106, 110, 112, and 114. Input control 110 can be used to close the container (e.g., hide the container from view). Input control 112 may be used to show information about an item. The type of information revealed can be user assignable, accordingly to particular implementations. Input control 114 opens or reveals a mask container which applies to the container 102. In general, expanding the container presents the contents of the container (e.g., sibling items) in the graphical user interface. Expanding a container in the graphical user interface is described in more detail below.

In addition, a container may include an input control (e.g., input control 106) that may reveal a path to additional containers in response to user input. For example, a path may be revealed that appears similar to FIG. 2A or 2B in response to receiving a click from a pointing device or a keyboard shortcut, to name two examples. In some implementations, the path reveal input control 106 is only visible when a container has been selected for isolation (e.g., when the "Container_expanded" container 102 has been selected for isolation).

Figure 2A:
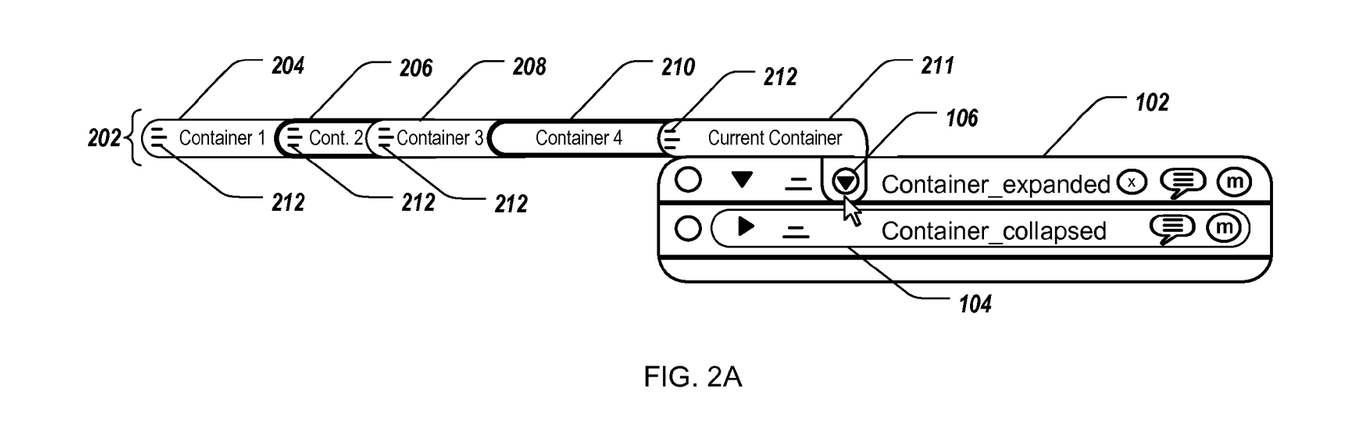
FIGS. 2A and 2B show examples of revealing one or more paths of an isolated container.

FIGS. 2A and 2B show examples of revealing one or more paths of an isolated container. For example, in reference to FIG. 2A, path 202 may be revealed upon user activation of input control 106. In general, the path 202 corresponds to a linear sequence representing parent containers of a current container organized in a container hierarchy. That is, the path may represent a linear sequence from the current container to a root container in the container hierarchy. For example, containers 204, 206, 208, and 210 are parent containers of the current container 211 and represent a linear sequence from the current container 211 to the root container 204.

Here, the current container is the "Current Container" container 211 and represents the "Container_expanded" container 102 in the path 202. However, the current container 211 need not be labeled "Current Container." Rather, any suitable name(s) can be assigned to the container and displayed in the container header or on an icon, to name some examples. Other designations are possible according to, e.g., user input.

In some implementations, there may be several possible paths from the current container 211 to the root container 204. In general, these paths may be created when one or more containers are cloned. In some implementations, a container may be cloned to act as a proxy for another container and/or function. Additionally, in some implementations, a cloned container may be used more than once in the process. For example, in the context of a compositing process, a cloned operation may be directed to a different portion of the composited image but may include one or more of the same sibling items as the original container. In some implementations, a clone is identical wherever it is located in the graph. In a sense, the same object can exist in multiple locations within the graph. The graphical user interface can include an indicator for when a container is a clone.

Figure 2B:
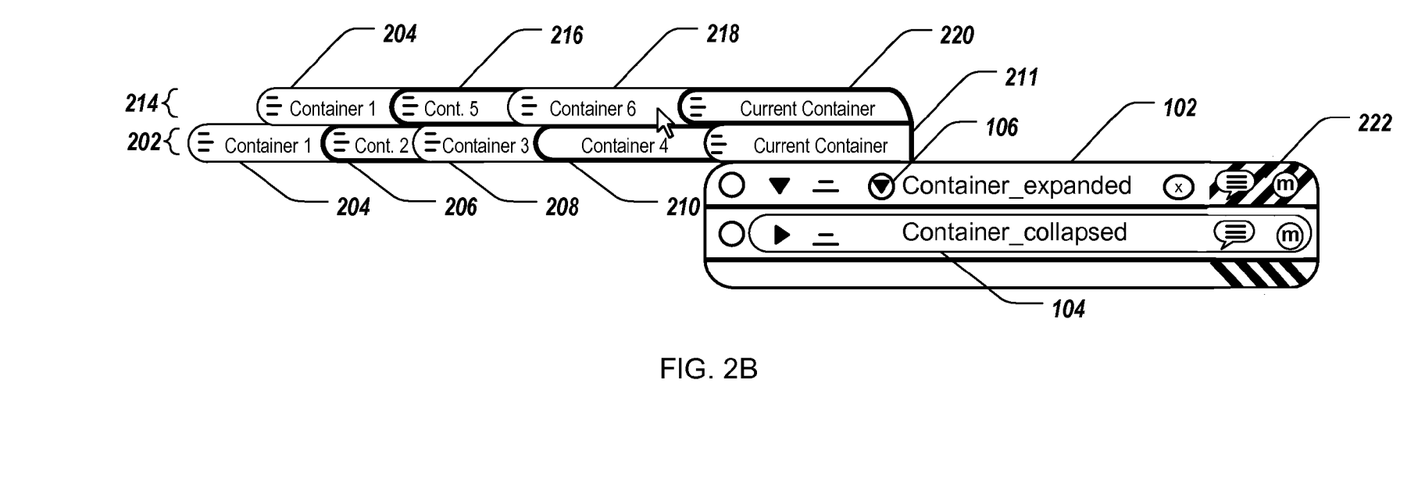

In reference to FIG. 2B, an example presentation of a first path 202 and a second path 214 is shown that illustrates how multiple paths may be presented. For example, the second path 214 includes the root "Container 1" container 204 and "Cont. 5" container 216 and "Container 6" container 218 in a linear sequence that also includes the cloned "Current Container" container 220 (which was cloned from the "Container_expanded" container 102). In addition, because there is a clone of container 102, the container includes a graphical representation 222 which indicates to a user that the container 102 has been cloned.

When the user navigates to the container (e.g., by opening parent containers down to a chosen level of granularity), the path taken by the user is considered the current path to the container and can be visually indicated, as discussed above. When a container is being displayed in isolation (e.g., as a separate container on the screen, without visible parent containers), the current path can be selected in another way. In some implementations, when multiple paths to a clone are available, the path that was actually traversed to arrive at the selected container is displayed nearest the current container. One or more other possible paths in the container hierarchy to the same current container can then be displayed elsewhere, such as above the traversed path. For example, because path 214 was actually traversed, and path 202 was not traversed, path 214 would be the presented path. That is, because here there are two paths 202 and 214 in the container hierarchy, the presented path is selected from the first path 202 and the second path 204.

Here, the paths are stacked vertically in the graphical user interface and are arranged parallel to each other. That is, the first linear sequence corresponding to the first path 202 is presented in parallel with a second linear sequence corresponding to the second path 214. As such, any number of linear sequences and corresponding paths may be presenting based on the number of paths from a current container to a root container according to the container hierarchy (e.g., according to the number of clones of container 102 in the container hierarchy). In some implementations, the path 202 and the path 214 may be stacked horizontally or in other configurations while still maintaining the parallel alignment. Some examples of these configurations are described in more detail below.

In some implementations, in the path representation (e.g., paths 202 and 214), each level of the hierarchy includes two parts:

1. Name of Parent—The name of a parent for each level in the path hierarchy.
2. Siblings Popup—input control represented by an icon which is responsive to user input and reveals the sibling items at each of the levels in the path hierarchy. In some implementations, the contents of the container may be used to determine whether an input control should be presented. For example, containers 204, 206, 208, and 211 include sibling pop-up input control 212 that can be used to present the contents included therein, while container 210 does not include a similar control because, e.g., container 210 does not include any additional items or because those items are already presented in the graphical user interface. Additionally, in some implementations, a function can resemble a container that has no contents (e.g., as a container that does not include the pop-up input control 114). For example, both functions and containers may be represented by a basic "pill" shape (e.g., similar to containers 204, 206, 208, or other items described in reference to FIGS. 1-5). Other shapes, some of which are described below, may also be presented.

Figure 3:
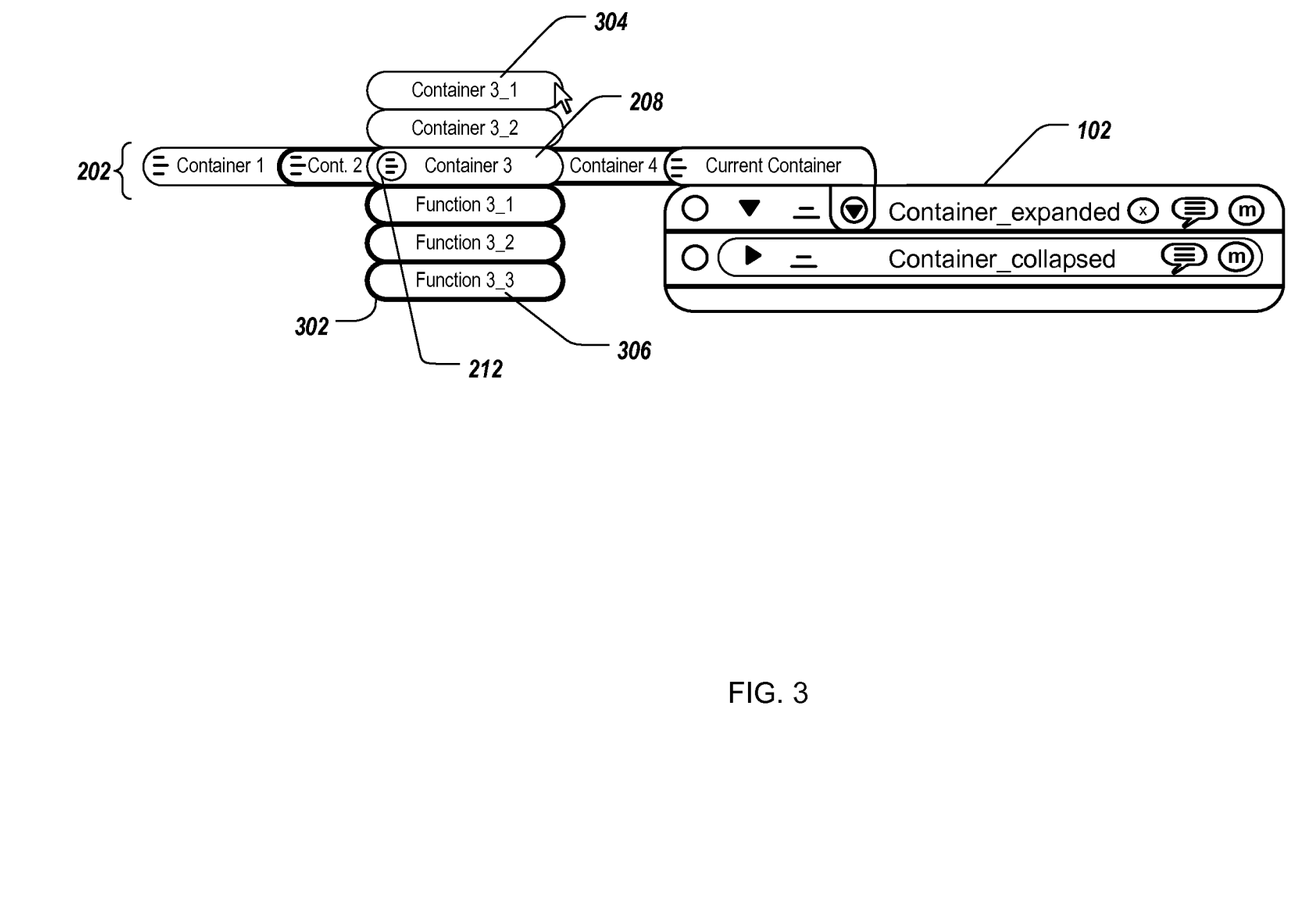
FIG. 3 shows an example of displaying sibling items associated with a parent container.

FIG. 3 shows an example of displaying sibling items associated with a parent container. In some implementations, the sibling items are provided in response to user input. For example, if the user wishes to see the stack of sibling items at a given level of the hierarchy, the user can hover over the respective sibling input control 212 next to each container in the hierarchy to see the stack of sibling items revealed as a list. Here, hovering over the sibling pop-up control associated with the container 208 can reveal a vertical sibling menu 302 where the user can select any or all of the sibling items. However, the sibling menu 302 can be presented in other manners (e.g., as a horizontal list or a radial list, to name two examples). In some implementations, when the cursor leaves the sibling menu 302, the path can remain visible as it was initially (e.g., as illustrated in FIG. 2A). In some implementations, the ordering of the sibling items in the sibling menu 302 can specify the order of operations performed. For example, in some implementations, the bottommost item (e.g., function 306) can be performed first, while the topmost item (e.g., items included in container 304) are performed last.

In general, any sibling item can be selected and revealed in the graphical user interface. For example, in some implementations, if sibling item 304 is selected, the sibling can be shown in isolation (e.g., as illustrated in FIG. 1). That is, the container 102 may be closed and the sibling item 304 may be opened and presented without a path (e.g., path 202). However, such a path could later be revealed according to receiving a path reveal request (e.g., if a user selects the input control 106 of the isolated container). Similarly, if the user selects any of the parent containers in the hierarchy (e.g., the parent containers presented in path 204), the currently selected container is closed and the parent which was selected in the path replaces the currently selected container.

Figure 4:
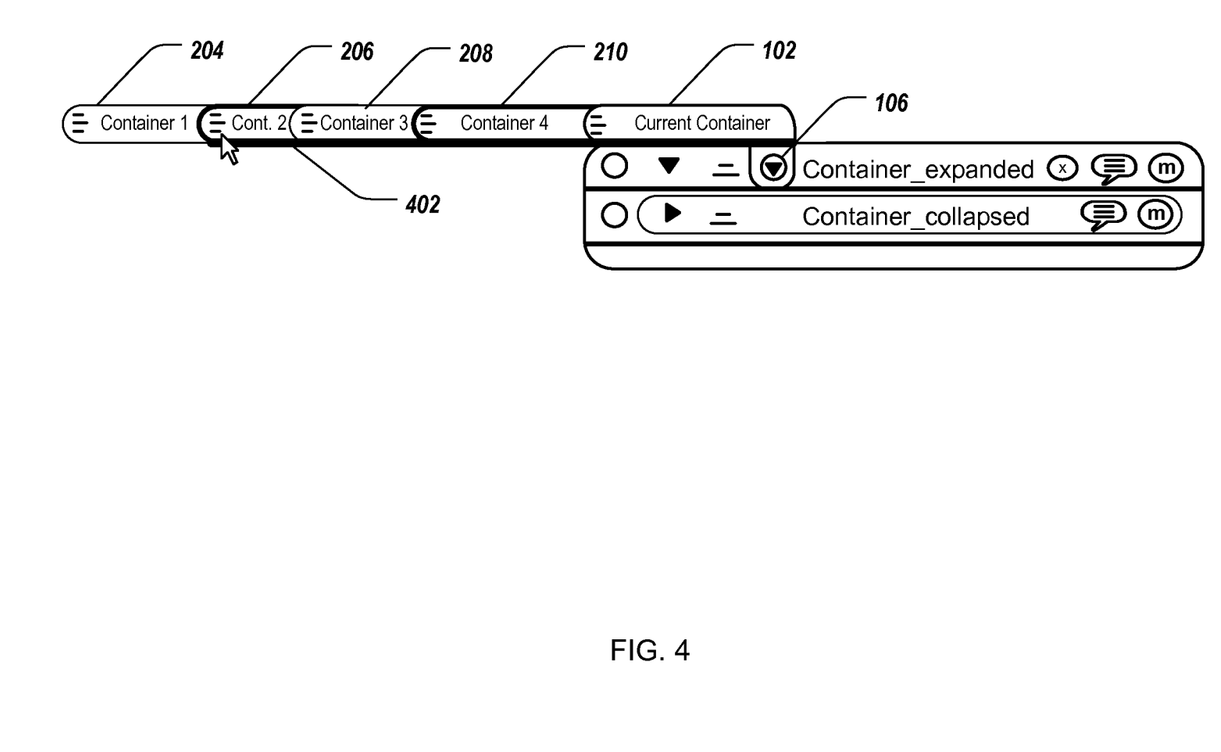
FIG. 4 shows an example of receiving a partial-performance request.

FIG. 4 shows an example of receiving a partial-performance request. In general, the user can provide input identifying a subset of the parent containers defined between the current container and a level in the hierarchy as the partial-performance request. For example, the user can drag, using a mouse or other user input device, a cursor or other selection function from the "Current Container" container 211 to any other container, such as the "Cont. 2" container 206, as illustrated by line 402. In some implementations, the user can drag an input control from the current container up to an arbitrary level of the path. For example, the user can drag the path reveal input control 106 (e.g., from the current container 211 to the container 206, which is the second-highest level in this example).

Doing so may have a variety of effects. In some implementations, in response to the partial-performance request, the first operation and those of the operations that the subset of the parent containers provide to the process may be performed. For example, the operations provided by containers 206, 208, 210, and 102 may be performed without performing the operations provided by container 204. In the context of an image compositing process, only the portions of a particular image corresponding to containers 206, 208, 210, and 102 would be composited in response to the partial-performance request and not the portion of the particular image corresponding to container 204, for example.

In addition, in some implementations, performing the dragging operation may open the parent of the "Cont. 2" container 206—here the "Container 1" container 204—and disclose the container or function at which the user ended the dragging (e.g., where the user dropped the dragged button). If the dragged-to item is a container, then it can be expanded (e.g., using an expansion mode described below) so that its contents are visible. The current object can remain selected and its attributes can be visible in an attribute editor if open. In some implementations, this operation can also be performed upon the user holding down the shift key when clicking on the parent item.

Figure 5:
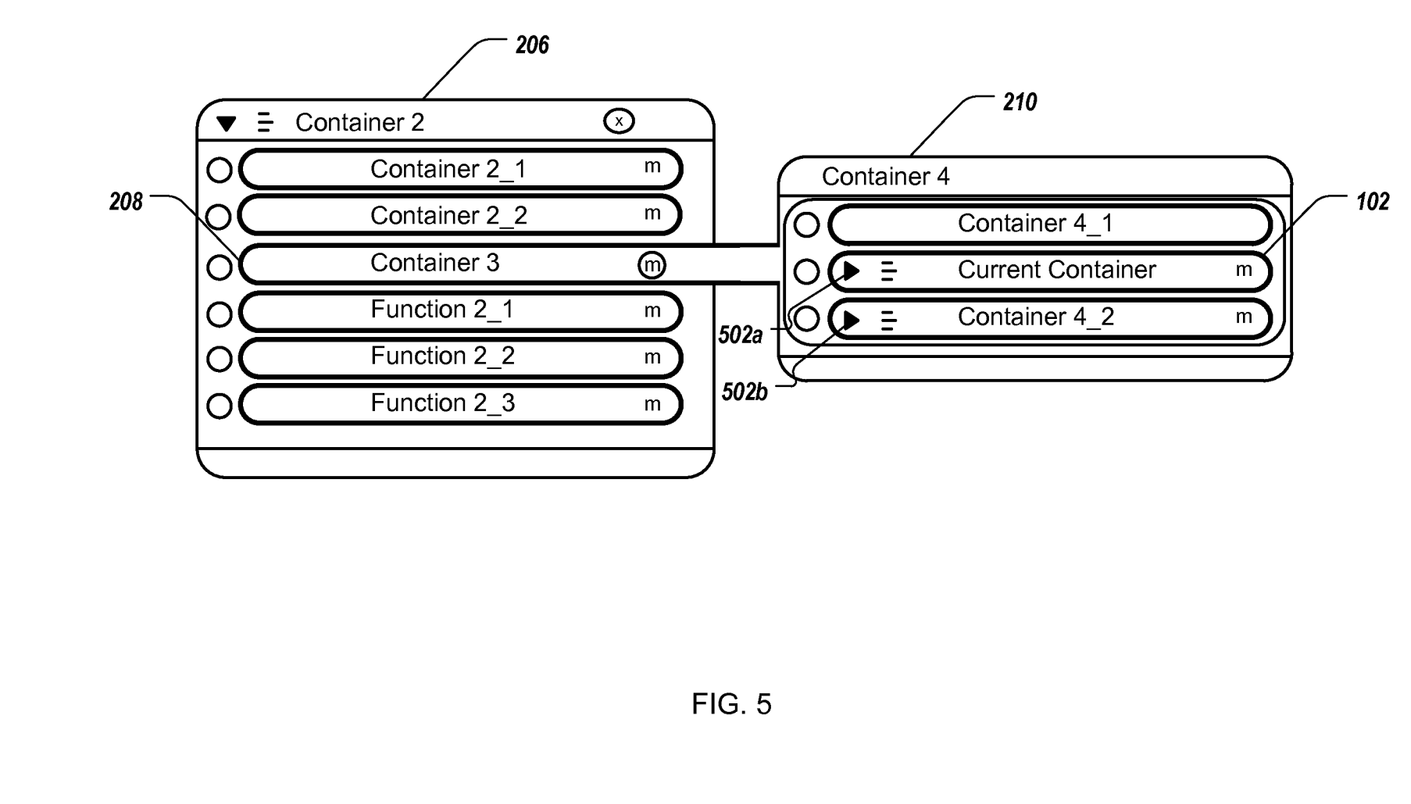
FIG. 5 shows an example of expanding a container.

FIG. 5 shows an example of expanding a container. Here, the container 206 is presented in response to the drag operation described above. That is, because the user performed a drag operation (e.g., illustrated by line 402 (FIG. 4)) the containers 206, 208, 210, and 102 are presented in an expanded manner according to the selection. In other words, in some implementations, the containers in the path can be iteratively expanded from the selected level in the hierarchy to the current container (e.g., the "Container_expanded" container 102). In some implementations, expanding a container can insert each subsequent level by a predetermined distance, e.g., 22 pixels, from one side, such as from the left side. Here, the "Container 2" container 206 is shown. The container 206 includes a number of items (e.g., functions and other containers). In the example shown, the "Container 3" container 208 is also shown in an expanded state because it contains additional items and was not the current container. Here, the "Container 3" container 208 is expanded in a columnar expansion mode, although other expansion modes are also possible.

The expansion modes can apply to essentially every container. Here, arrow symbols 502a and 502b can be used for choosing the expansion mode. For example, on in the "Container_expanded" container 102 the user can "tug" the arrow symbol 502a (e.g., using a mouse or other pointing device) in a horizontal direction to expand the corresponding item using a first expansion mode (e.g., a columnar expansion mode). As another example, the user can tug the arrow symbol 502 in a vertical direction on any of the items in the container 210 to expand the corresponding item using a different expansion mode. If the input controls 502a or 502b are tugged (or otherwise activated), corresponding to one of the expansion modes, on an item that is currently expanded using the other expansion mode, then the item can be changed from the current expansion mode directly into the new expansion mode without being placed in a collapsed state in between. Other input controls for choosing between expansion modes can be used.

In some implementations, one or more keyboard shortcuts can be used to manage items. For example, a keyboard shortcut of one or more keystrokes can be used to place a selected container at a chosen location in the path. As another example, a keyboard shortcut can be used to select the expansion mode for a selected container.

After the corresponding containers are expanded, the user can close, relocate or otherwise manipulate some or all of the items in containers 206 and 210. This can allow the user to remove any operations that are not immediately relevant to the task(s) that the user is about to perform. Additionally, this can allow the user to configure one or more aspects of one or more of the functions (e.g., changing one or more input values associated with a function which may result in a change to the output of the function).

The following describes additional examples of features provided by the graphical user interface. Containers can be expanded by tugging downward on a user input control (e.g., input controls 502a or 502b). A single container which by default is collapsed in the graphical user interface can instead be expanded. A possible exception to this involves functions which have no contents but have a mask or other secondary input. These can for example expand to the right in columnar mode only. The expansion of these inputs may always take place in columnar mode. Their expansion is initiated from the expansion toggle on the right and is the only way to reveal a secondary input. Functions have no disclosure toggle.

In some implementations, one or more keyboard keys can modify a behavior when held down while selecting one of the parents in the path hierarchy. For example, holding down the Shift key when selecting (e.g., when clicking) any level higher than the current level may reveal the parent container and expand to reveal the currently selected object. As another example, holding down the Alt key when selecting (e.g., clicking) any level of the path can reveal the clicked container in isolation in the graphical user interface. Additionally, in some implementations, a cursor change can indicated the modified behavior. For example, a cursor change can indicate that an isolated container will be presented when a user presses the Alt key.

Figure 6:
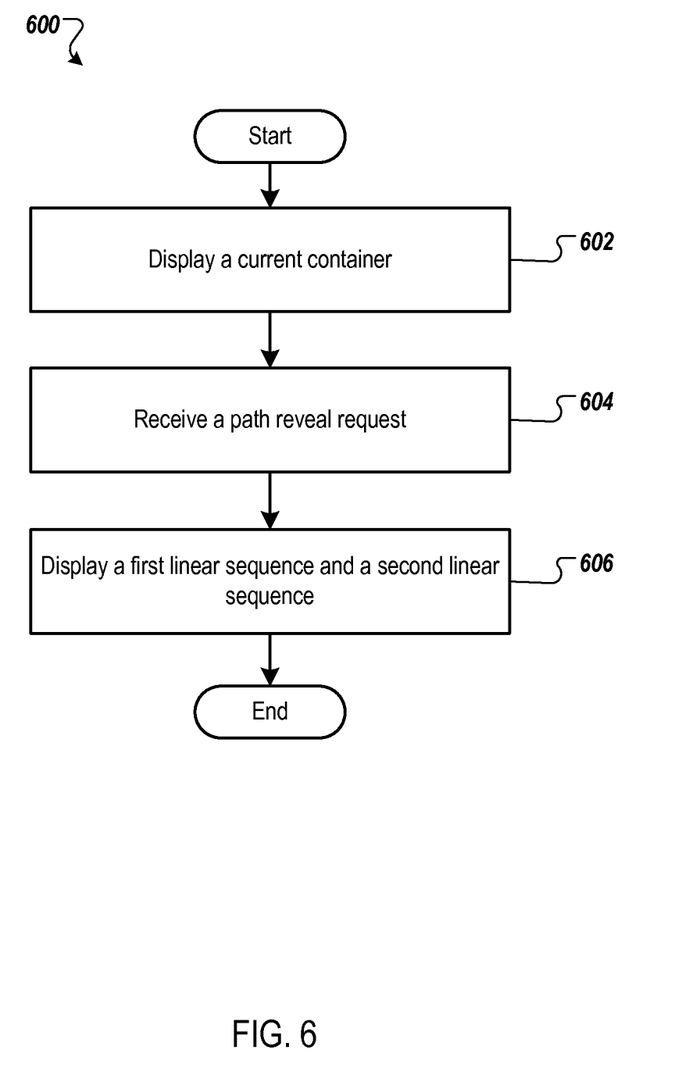
FIG. 6 shows an example technique for revealing a plurality of paths of an isolated container.

FIG. 6 shows an example technique 600 for revealing a plurality of paths of an isolated container. The technique 600 can be performed by a processor executing instructions from a computer-readable medium. For simplicity, the technique 600 will be described from the standpoint of a system that is configured to perform the technique 600. Also, for illustrative purposes, the technique 600 is described in reference to FIGS. 1 and 2B, but the technique 600 is not limited to those elements depicted in FIGS. 1 and 2B.

In step 602, the system displays, in a display device area that controls a process of operations defined by containers organized in a hierarchy, a current container providing at least a first operation to the process. For example, the system can display the "Container_expanded" container 102 in a graphical user interface in the display device area.

In step 604, the system, receives a path reveal request for the current container. For example, the system can receive a path reveal request corresponding to a user selection of input control 106.

In step 606, the system displays, adjacent the current container in the display device area and in response to the path reveal request: a first linear sequence that represents first parent containers of the current container corresponding to a first path in the hierarchy and a second linear sequence that represents second parent containers of the current container corresponding to a second path in the hierarchy. For example, the system can display a first linear sequence that represents the parent containers 204, 206, 208, and 210 of the current container 211 corresponding to the first path 202. Furthermore, the system can display a second linear sequence that represents the parent containers 204, 216, and 218 of the current container 220 corresponding to the second path 214.

Figure 7:
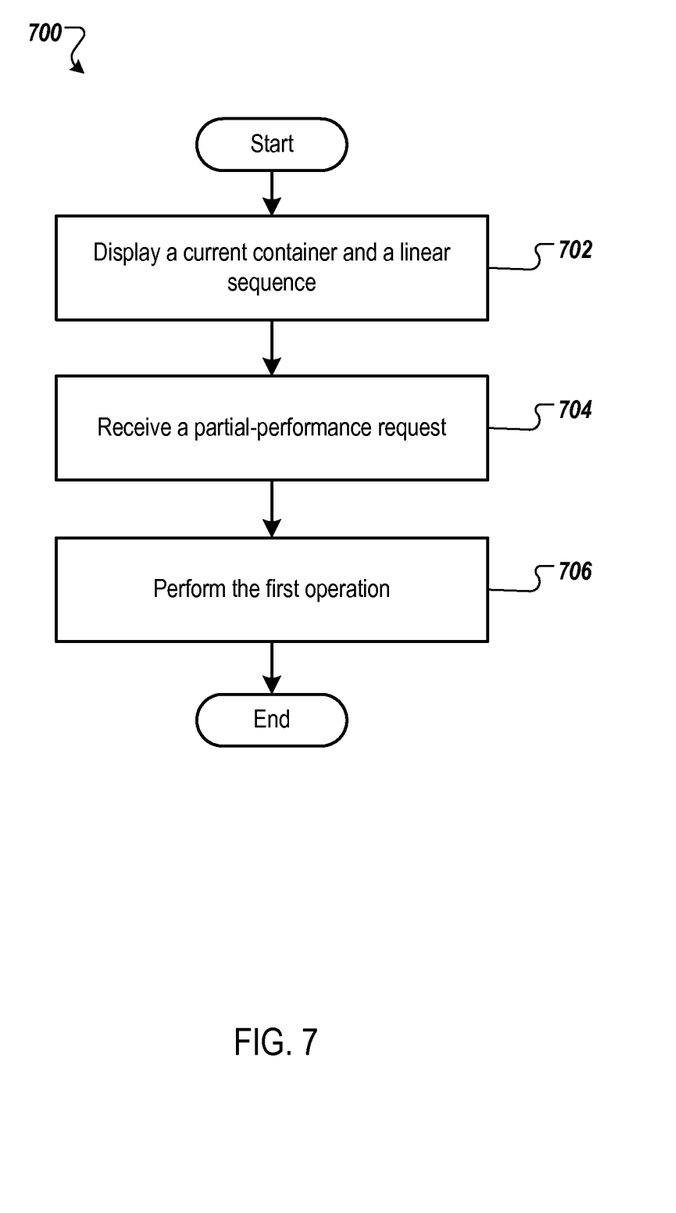
FIG. 7 shows an example technique that can be used with the technique in FIG. 6.
Figure 8A:
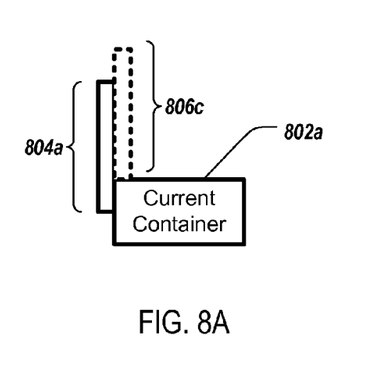
FIGS. 8A-8D show examples of representations that may be presented in the graphical user interface.
Figure 8B:
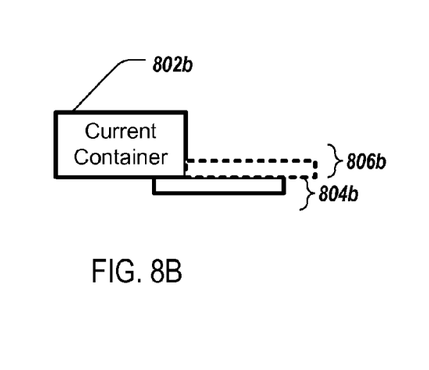
Figure 8C:
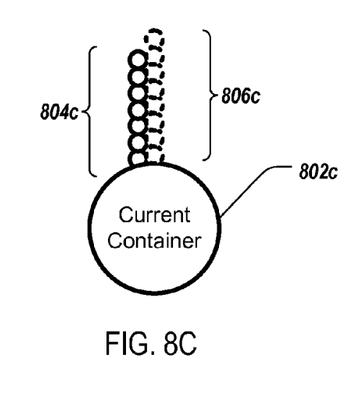
Figure 8D:
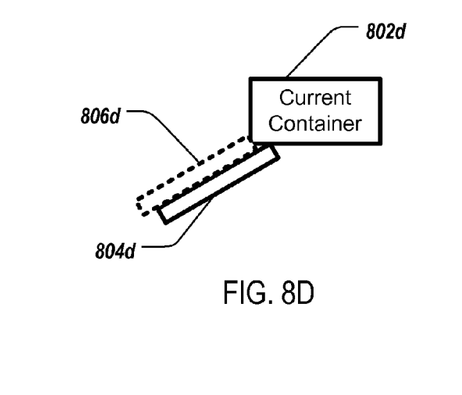

FIG. 7 shows an example technique 700 that can be used with the technique 600 in FIG. 6. The technique 700 can be performed before, between or after any of the steps in technique 600, by a processor executing instructions from a computer-readable medium. For simplicity, the technique 700 is described from the standpoint of a system that is configured to perform the technique 700. Also, for illustrative purposes, the technique 700 is described in reference to FIGS. 2A and 4, but the technique 700 is not limited to those elements depicted in FIGS. 2A and 4.

In step 702, the system displays, in a display device area that controls a process of operations, a current container providing at least a first operation to the process, and a linear sequence representing parent containers of the current container organized in a hierarchy. In some implementations, the system can display a linear sequence corresponding to path 202 that represents parent containers 204, 206, 208, and 210 of the current container 211. For example, the linear sequence can be one of those displayed according to step 606.

In step 704, the system receives a partial-performance request identifying a subset of the parent containers defined between the current container and a level in the hierarchy. For example, the system can receive a drag operation from an input device identifying the subset of containers 206, 208, and 210. The partial-performance request can be received before or after the path reveal request is received in step 604.

In step 706, the system performs, in response to the partial-performance request, the first operation and those of the operations that the subset of the parent containers provides to the process. For example, in the context of a compositing operation, the system can perform the operations provided by containers 206, 208, 210, and 211, while not performing the operations provided by the container 204. The first operation can be performed before or after the first and second linear sequences are displayed in step 606.

FIGS. 8A-8D show examples of alternative representations that may be presented in the graphical user interface. In general, a current container 802a-802d can be presented in the graphical user interface and one or more paths 804a-804d and 806a-806 may be presented adjacent to the current container 802a-802d. For example, in portions of the container hierarchy that include cloned containers, the current container can be presented adjacent to and parallel with a plurality of paths (e.g., paths 804a-804 in parallel with paths 804a-804d, respectively). As another example, if the particular portion of the container hierarchy presented does not include any cloned containers, a single path may be represented (e.g., paths 804a-804d may be presented adjacent to current container 802a-802d, respectively). Any of the functionality described above may be implemented in the alternative implementations. For example, any of the parent containers included in the paths 804a-804d may include input controls 212 that are responsive to user input and present a sibling menu (e.g., sibling menu 302).

Containers with shapes other than rectangular can be used in some implementations. For example, circular, elliptical, triangular, polygonal, or irregular containers can be used. Some implementations can use three-dimensional containers.

In some implementations, the representations may be modified according to the contents of a container. For example, a container may be represented according to the number of items contained therein. That is, a container can be represented larger in the graphical user interface if it has many items, and smaller in the graphical user interface if it contains few items.

Figure 9:
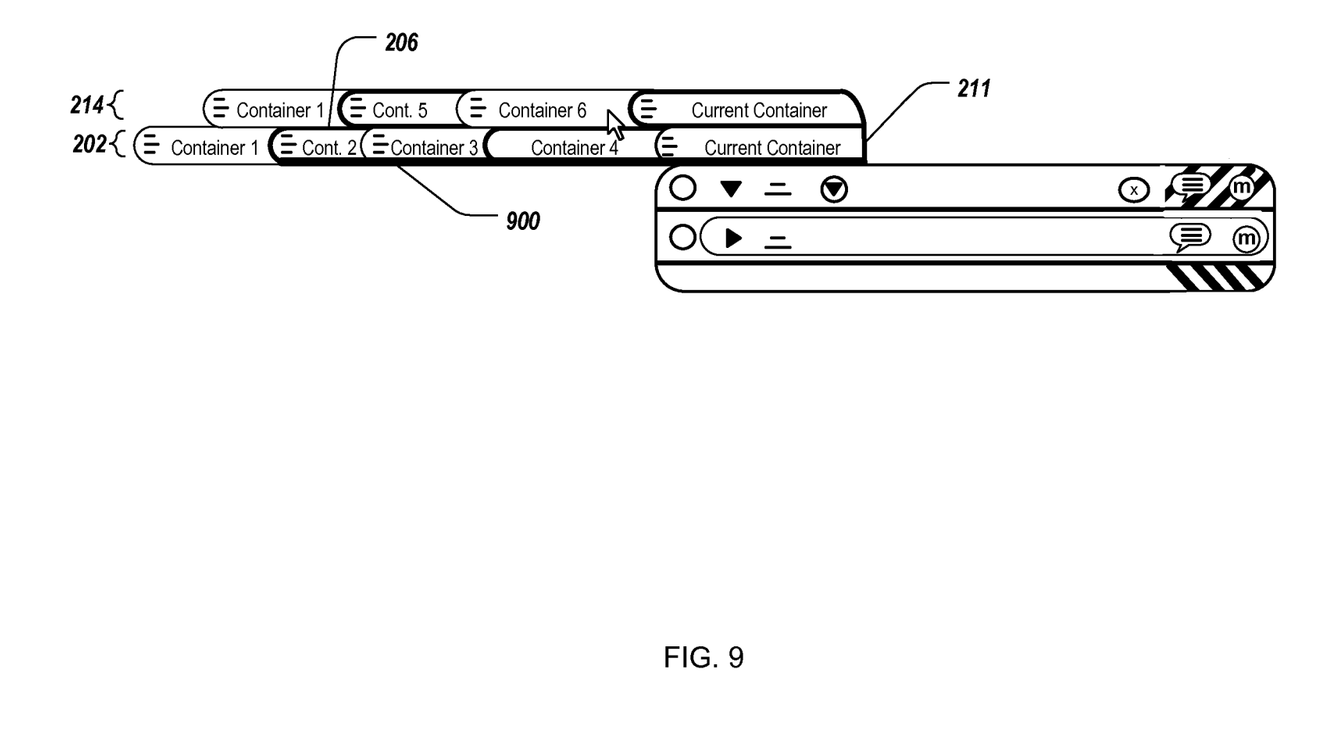
FIG. 9 shows an example of receiving a partial-performance request for one of the revealed paths of FIG. 2B.

FIG. 9 shows an example of receiving a partial-performance request for one of the revealed paths of FIG. 2B. Here, the partial-performance request is generated for the path 202. For example, the user can drag, using a mouse or other user input device, a cursor or other selection function from the "Current Container" container 211 to any other container, such as the "Cont. 2" container 206, as illustrated by line 900. In some implementations, the user can drag an input control from the current container up to an arbitrary level of the path. In a similar way the user can generate a partial-performance request for the path 214, and a line corresponding to the line 900 can then be shown to illustrate the request. The partial-performance request may have a variety of effects, for example that the first operation and those of the operations that the subset of the parent containers provide to the process are performed.

Figure 10:
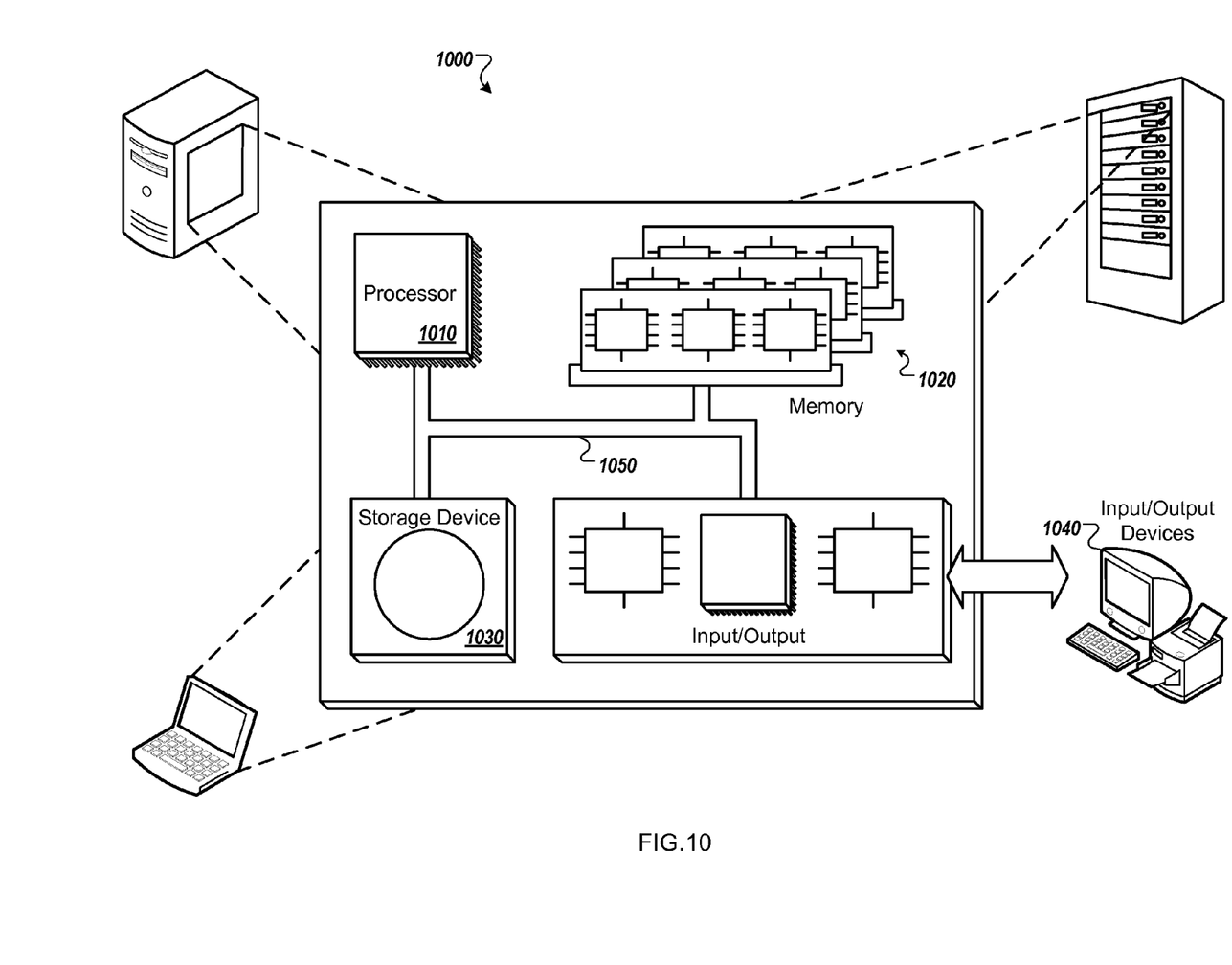
FIG. 10 is a block diagram of a computing system that can be used in connection with computer-implemented methods described in this document.

FIG. 10 is a schematic diagram of a generic computer system 1000. The system 1000 can be used for the operations described in association with any of the computer-implement methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. The memory 1020 is a volatile memory unit in some implementations and is a non-volatile memory unit in other implementations.

The storage device 1030 is capable of providing mass storage for the system 1000. In one implementation, the storage device 1030 is a computer-readable medium. In various different implementations, the storage device 1030 may be a solid state drive, such as RAM outfitted with a hard drive data bus, a floppy disk device, a hard disk device, an optical disk device, a tape device, or holographic storage.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method of representing an image compositing process, the method comprising:
displaying, in a display device area including containers organized in a container hierarchy, a current container representing at least a first image compositing operation of the image compositing process, wherein the container hierarchy corresponds to a hierarchy of image compositing operations, the hierarchy of image compositing operations comprising:
a first path to the first image compositing operation; and
a second path to the first image compositing operation;
receiving, in a system generating the display device area, a path reveal request for the current container; and
displaying, adjacent to the current container in the display device area and in response to the path reveal request:
a first linear sequence that represents first parent containers of the current container corresponding to the first path to the first image compositing operation in the hierarchy of image compositing operations; and
a second linear sequence that represents second parent containers of the current container corresponding to the second path to the first image compositing operation in the hierarchy of image compositing operations.

2. The computer-implemented method of claim 1, further comprising:
receiving, in the system, user input corresponding to a hovering operation by a cursor proximate to one of the parent containers in the first linear sequence or the second linear sequence; and
displaying, in the display device area, each sibling item associated with the parent container.

3. The computer-implemented method of claim 1, wherein the first path and the second path are displayed parallel to each other.

4. The computer-implemented method of claim 3, wherein the first path is displayed nearer the current container than the second path, based on the first path having been used for navigating to the current container.

5. The computer-implemented method of claim 1, further comprising:

receiving, in the system, user input corresponding to an isolation request for one of the parent containers in one of the first linear sequence and the second linear sequence; and displaying, in the display device area, the parent container in isolation from a remainder of either the first linear sequence or the second linear sequence.

6. The computer-implemented method of claim 1, further comprising:

receiving, in a system generating the display device area, a partial-performance request for one of the first and second linear sequences, the partial-performance request identifying a subset of the first or second parent containers defined between the current container and a level in the hierarchy; and performing, in response to the partial-performance request, the first image compositing operation and those of the image compositing operations that the subset of the parent containers provide to the process.

7. The computer-implemented method of claim 6, wherein the partial-performance request is received from at least one user input device and is generated by a dragging operation starting at the current container and ending at the level in the hierarchy.

8. A non-transitory, computer-readable storage medium comprising instructions that, when executed by a one or more processors, cause the one or more processors to perform operations comprising:

displaying, in a display device area including containers organized in a container hierarchy, a current container representing at least a first image compositing operation of the image compositing process, wherein the container hierarchy corresponds to a hierarchy of image compositing operations, the hierarchy of image compositing operations comprising:
a first path to the first image compositing operation; and
a second path to the first image compositing operation;

receiving, in a system generating the display device area, a path reveal request for the current container; and displaying, adjacent to the current container in the display device area and in response to the path reveal request:
a first linear sequence that represents first parent containers of the current container corresponding to the first path to the first image compositing operation in the hierarchy of image compositing operations; and
a second linear sequence that represents second parent containers of the current container corresponding to the second path to the first image compositing operation in the hierarchy of image compositing operations.

9. The computer program product of claim 8, the method further comprising:

receiving, in a system generating the display device area, a partial-performance request for one of the first and second linear sequences, the partial-performance request identifying a subset of the first or second parent containers defined between the current container and a level in the hierarchy; and performing, in response to the partial-performance request, the first image compositing operation and those of the image compositing operations that the subset of the parent containers provide to the process.

10. The computer program product of claim 9, wherein the partial-performance request is received from at least one user input device and is generated by a dragging operation starting at the current container and ending at the level in the hierarchy.

11. A non-transitory, computer-readable storage medium including instructions that, when executed by one or more processors, generate in a display device area a graphical user interface for representing an image compositing process, the graphical user interface comprising:

a current container providing at least a first image compositing operation of an image compositing process, wherein:
the current container is part of a container hierarchy;
the container hierarchy corresponds to a hierarchy of image compositing operations in the image compositing process; and
the hierarchy of image compositing operations comprises a first path to the first image compositing operation and a second path to the first image compositing operation; and;

a first linear sequence that represents first parent containers of the current container corresponding to the first path to the first image compositing operation in the hierarchy of image compositing operations;

a second linear sequence that represents second parent containers of the current container corresponding to the second path to the first image compositing operation in the hierarchy of image compositing operations; and a first input control for generating a path reveal request for the current container, wherein the first linear sequence and second linear sequence are displayed, in the display device area, adjacent to the current container and in response to the path reveal request.

12. The computer program product of claim 11, wherein the graphical user interface further comprises:

a second input control responsive to a hovering operation by a cursor proximate to one of the parent containers in the first linear sequence or the second linear sequence; and a first presentation control for displaying, in the display device area, each sibling item associated with a parent container.

13. The computer program product of claim 12, wherein the graphical user interface further comprises:

a third input control responsive to user input corresponding to an isolation request for one of the parent containers; and a second presentation control for displaying, in the display device area, the parent container in isolation from a remainder of the first linear sequence or the second linear sequence.

14. The computer program product of claim 11, wherein the first path and the second path are displayed parallel to each other.

15. The computer program product of claim 14, wherein the first path is displayed nearer the current container than the second path, based on the first path having been used for navigating to the current container.

16. The computer program product of claim 11, wherein the process of operations is directed to the generation of at least one composite image corresponding to the operations of the first linear sequence or the second linear sequence.

17. The computer program product of claim 11, wherein the graphical user interface further comprises:

a second input control for generating a partial-performance request for one of the first and second linear sequences, the partial-performance request identifying a subset of the first or second parent containers defined between the current container and a level in the hierarchy.

18. The computer program product of claim 17, wherein the second input control is responsive to input from at least one user input device generated by a dragging operation starting at the current container and ending at the level in the hierarchy.

* * * * *